United States Patent
Wauke

(10) Patent No.: US 10,847,296 B2
(45) Date of Patent: Nov. 24, 2020

(54) VIBRATION GENERATING DEVICE

(71) Applicant: ALPS ALPINE CO., LTD., Tokyo (JP)

(72) Inventor: Tomokuni Wauke, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 153 days.

(21) Appl. No.: 16/295,354

(22) Filed: Mar. 7, 2019

(65) Prior Publication Data

US 2019/0206601 A1    Jul. 4, 2019

Related U.S. Application Data

(63) Continuation of application No. PCT/JP2017/033067, filed on Sep. 13, 2017.

(30) Foreign Application Priority Data

Sep. 14, 2016   (JP) .................................. 2016-179388

(51) Int. Cl.
  *H01F 7/126*  (2006.01)
  *H02K 33/18*  (2006.01)
  (Continued)

(52) U.S. Cl.
  CPC ............. *H01F 7/126* (2013.01); *B06B 1/045* (2013.01); *H01F 7/0289* (2013.01); *H01F 7/066* (2013.01);
  (Continued)

(58) Field of Classification Search
  CPC ........ H01F 7/126; H01F 7/0289; H01F 7/066; H01F 7/081; H01F 7/16; H02K 33/18; B06B 1/045
  See application file for complete search history.

(56) References Cited

U.S. PATENT DOCUMENTS 4,374,330 A  *  2/1983  Fey ...................... F04B 35/045
                                                307/132 E
2007/0207672 A1* 9/2007 Takagi .................... B06B 1/045
                                                439/607.01
(Continued)

FOREIGN PATENT DOCUMENTS

JP   2004-147386   5/2004
JP   2008-058946   3/2008
(Continued)

OTHER PUBLICATIONS

International Search Report dated Nov. 21, 2017 in PCT/JP2017/033067 filed on Sep. 13, 2017.

*Primary Examiner* — Mohamad A Musleh
(74) *Attorney, Agent, or Firm* — IPUSA, PLLC

(57) ABSTRACT

A vibration generating device includes an electromagnet including a coil and a magnetic core around which the coil is wound; a permanent magnet; a casing to which the electromagnet or the permanent magnet is fixed; and an elastic body in which the electromagnet or the permanent magnet is held. The vibration generating device generates a vibration by relatively moving the electromagnet and the permanent magnet by energizing the coil. The casing has a polyhedral structure made of a plate material, and includes a first surface in which a gap portion is provided and another surface in which an extension portion is provided. The vibration generating device further includes a reinforcement portion that is formed by the extension portion extending from the another surface toward the first surface, thereby being fitted into the gap portion and flush with the first surface.

8 Claims, 13 Drawing Sheets

(51) Int. Cl.
   *H01F 7/02*   (2006.01)
   *H01F 7/06*   (2006.01)
   *B06B 1/04*   (2006.01)
   *H01F 7/08*   (2006.01)
   *H01F 7/16*   (2006.01)

(52) U.S. Cl.
   CPC .............. *H01F 7/081* (2013.01); *H01F 7/16* (2013.01); *H02K 33/18* (2013.01)

(56) References Cited

U.S. PATENT DOCUMENTS

| | | | |
|---|---|---|---|
| 2011/0266892 A1* | 11/2011 | Wauke | B06B 1/045 310/25 |
| 2012/0313459 A1* | 12/2012 | Zhang | H02K 33/18 310/25 |
| 2013/0061736 A1 | 3/2013 | Wauke | |
| 2018/0062492 A1* | 3/2018 | Akanuma | H02K 33/16 |

FOREIGN PATENT DOCUMENTS

| | | |
|---|---|---|
| JP | 2013-056309 | 3/2013 |
| JP | 2016-096677 | 5/2016 |

\* cited by examiner

VIBRATION GENERATING DEVICE

CROSS-REFERENCE TO RELATED APPLICATION

The present application is a continuation application of International Application No. PCT/JP2017/033067 filed on Sep. 13, 2017, which is based on and claims priority to Japanese Patent Application No. 2016-179388 filed on Sep. 14, 2016. The contents of these applications are incorporated herein by reference in their entirety.

BACKGROUND OF THE INVENTION

1. Field of the Invention

The present invention relates to a vibration generating device, and in particular, to a vibration generating device including a vibration body supported by a casing so as to be vibratable via an elastic body.

2. Description of the Related Art

Conventionally, vibration generating devices have been in practical use. Specifically, the vibration generating devices are installed in electronic devices such as portable information terminals or game machines, and generate vibrations used for reporting an incoming call in portable information terminals, or to provide haptic feedback in game machines.

Conventional vibration generating devices used for such applications, for example, include the vibration generating device described in Patent Document 1. Hereinafter, a configuration of the conventional vibration generating device will be described with reference to FIG. 13. FIG. 13 is an explanatory view illustrating a configuration of a conventional vibration generating device 900, and illustrates the configuration of the vibration generating device 900 according to Patent Document 1. Note that in FIG. 13, the X direction, the Y direction, and the Z direction indicate three directions that are orthogonal to each other.

As illustrated in FIG. 13, the vibration generating device 900 includes a casing 910, a vibrating body 920 accommodated in the casing 910, an elastic body 940 that supports the vibrating body 920 so that the vibrating body 920 vibrates along a first direction and a second direction, and a magnetic driving unit 950 that drives the vibrating body 920 along the first direction and the second direction by using a magnetic force. The magnetic driving unit 950 is a vibration generating device that includes a first magnetic field generating unit that is disposed on the side of the vibrating body 920, and a second magnetic field generating unit disposed on the side of the casing 910 so as to be positioned on an extended line of the vibrating body 920 in a third direction orthogonal to the first direction and the second direction. The elastic body 940 has a plurality of folded portions bent so that the fold lines are along the third direction, and a plate spring in which a flat portion extends from one of the plurality of folded portions to another one of the plurality of folded portions.

With such a configuration, the vibration generating device 900 has the effect of stabilizing the vibration motion of the vibrating body.

Patent Document 1: Japanese Unexamined Patent Application Publication No. 2016-096677

SUMMARY OF THE INVENTION

According to one aspect of the present invention, there is provided a vibration generating device including an electromagnet including a coil and a magnetic core around which the coil is wound; a permanent magnet; a casing to which one of the electromagnet and the permanent magnet is fixed; and an elastic body in which another one of the electromagnet and the permanent magnet is held. The vibration generating device generates a vibration by relatively moving the electromagnet and the permanent magnet by energizing the coil. The casing has a polyhedral structure made of a plate material, and the casing includes a first surface in which a gap portion is provided and another surface in which an extension portion is provided. The vibration generating device further includes a reinforcement portion that is formed by the extension portion extending from the another surface toward the first surface, thereby being fitted into the gap portion and flush with the first surface.

DETAILED DESCRIPTION OF THE PREFERRED EMBODIMENTS

Figure 1:
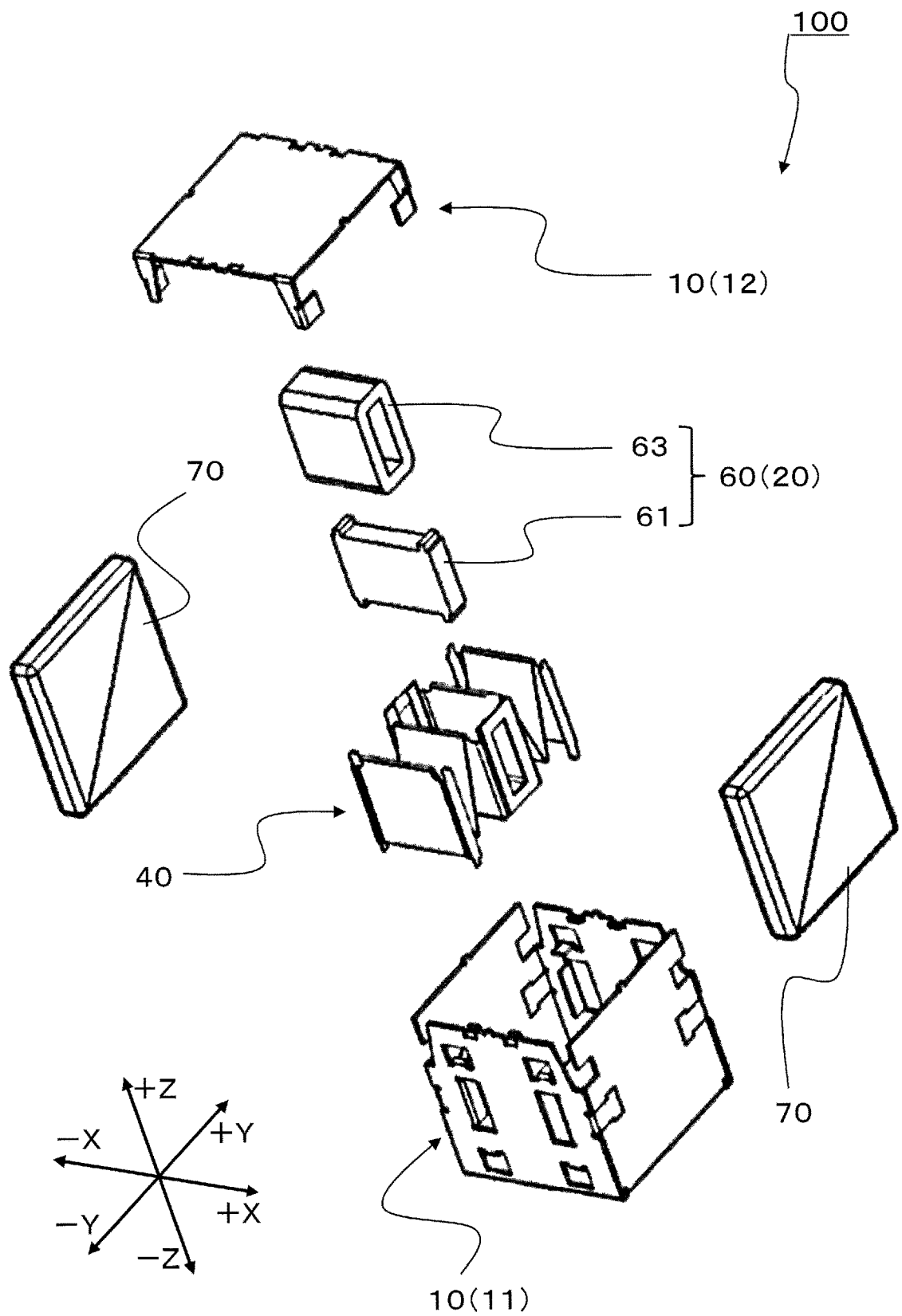
FIG. 1 is an exploded perspective view illustrating members of a vibration generating device according to a first embodiment of the present invention.

In recent years, with respect to vibration generating devices used for generating vibration for haptic feedback in game machines, etc., there are requirements for vibration with lower frequency and more weightiness. Therefore, it is conceivable to increase the size of the vibrating body. However, when the size of the vibrating body is increased, the mass of the vibrating body is increased, and, therefore, there has been a problem that the strength of the casing becomes insufficient, in the conventional vibration generating device.

The vibration generating device according to an aspect of the present invention is provided with a reinforcement portion, in which an extension portion provided in another surface of the casing is fitted into a gap portion provided in a first surface of the casing, and, therefore, the vibration generating device has a good assembling property (can be easily assembled) while increasing the strength of the casing.

First Embodiment

Hereinafter, the present invention will be described with reference to the drawings. A vibration generating device 100 according to a first embodiment of the present invention is installed in an electronic device such as a portable information terminal and a game machine, and generates vibrations for reporting incoming calls in a portable information terminal or generates vibrations used to provide haptic feedback in a game machine. The use of the vibration generating device of the present invention is not limited to the embodiments described below and can be appropriately changed. Note that in the present specification, in the description of each drawing, for the sake of convenience, references are made to a right side, a left side, a rear side, a front side, an upper side, and a lower side; however, these respectively indicate the +X side, the −X side, the +Y side, the −Y side, the +Z side, and the −Z side in the drawings, and the installation direction of the product and the direction at the time of use are not limited to these.

Figure 2:
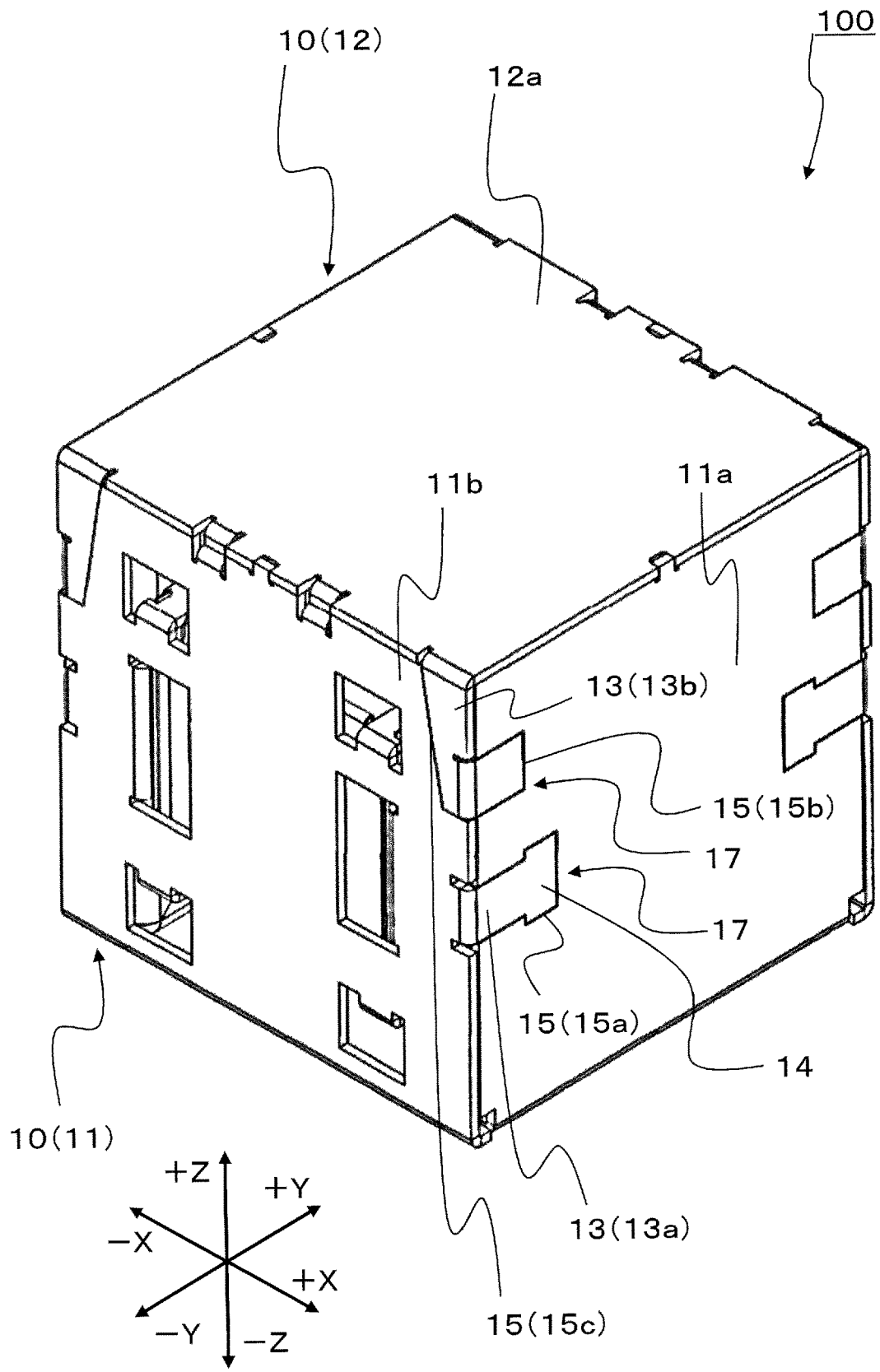
FIG. 2 is a perspective view illustrating an external appearance of the vibration generating device.
Figure 3:
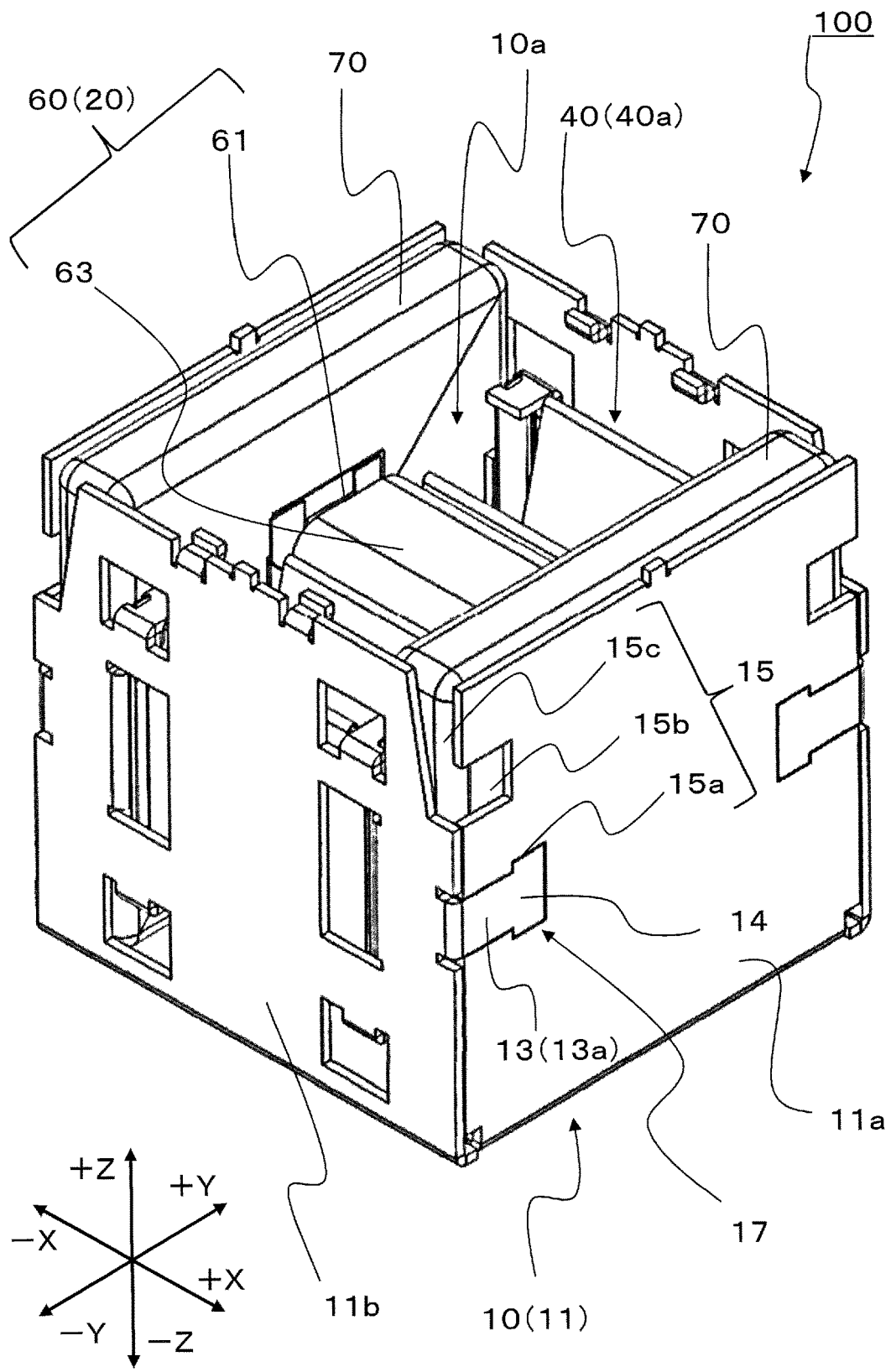
FIG. 3 is a perspective view illustrating an external appearance of the vibration generating device in a state in which a lid portion of the casing is removed.
Figure 4:
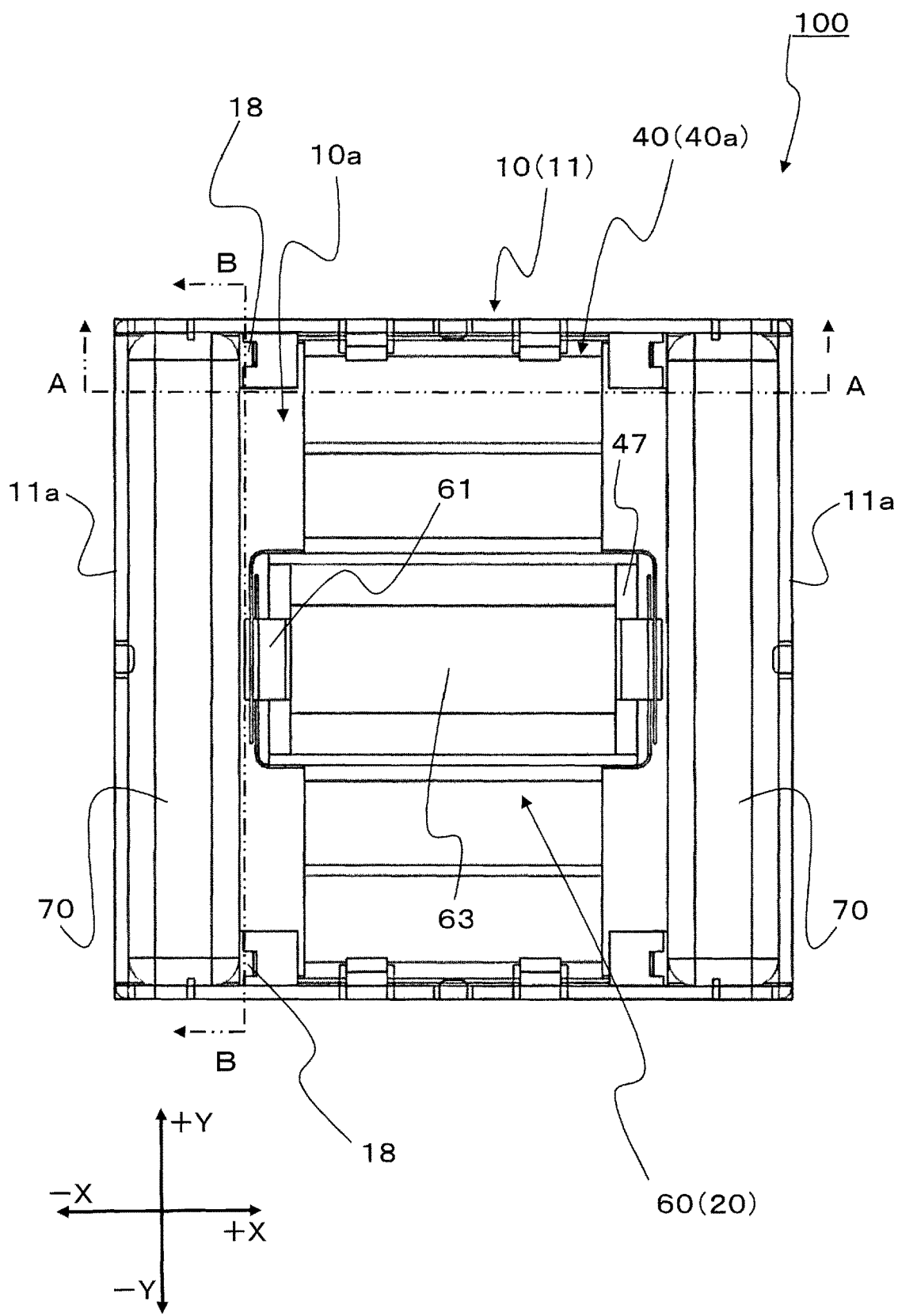
FIG. 4 is a plan view of the vibration generating device in a state in which the lid portion of the casing is removed.
Figure 5:
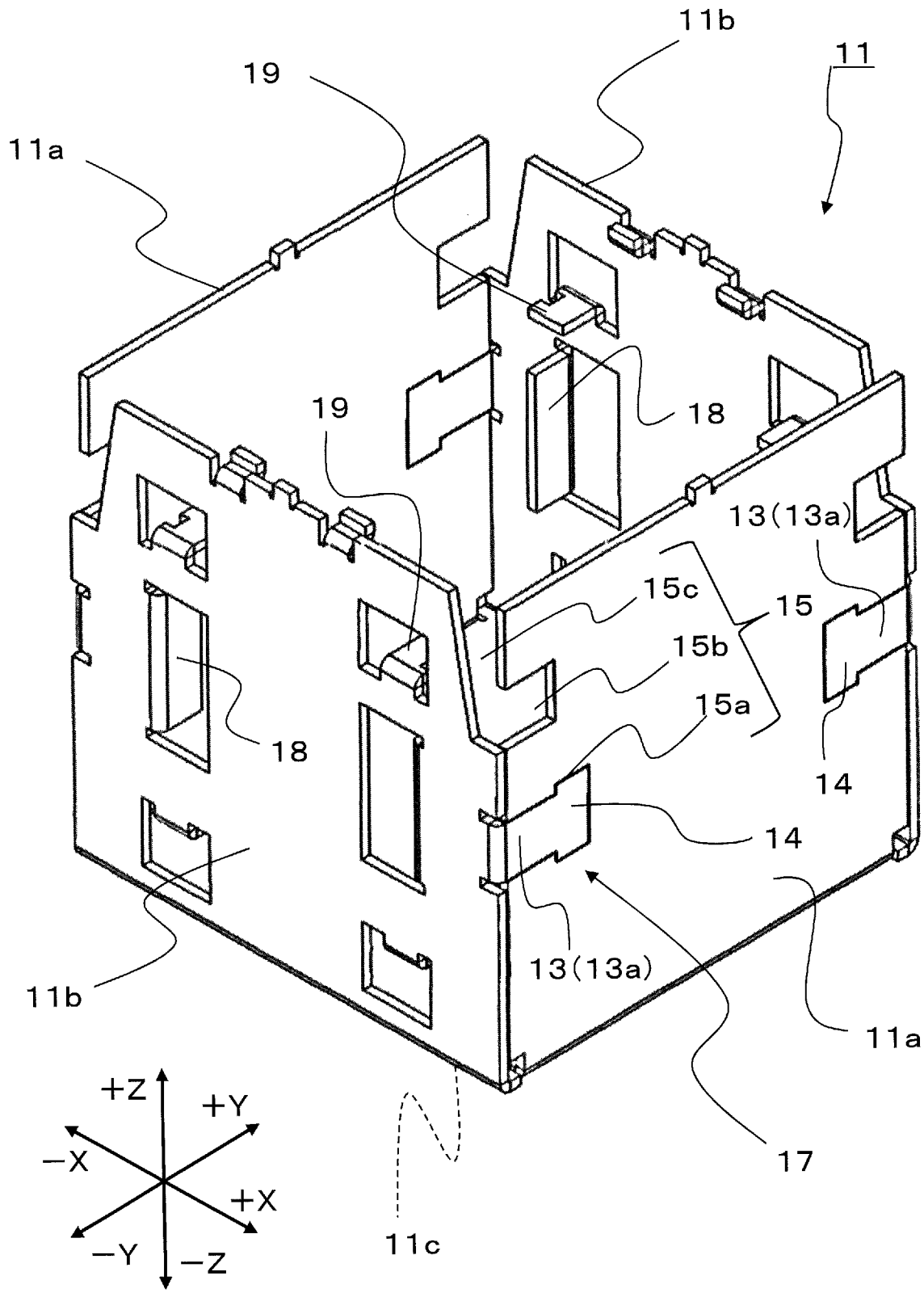
FIG. 5 is a perspective view illustrating a structure of a main body portion of the casing.
Figure 6:
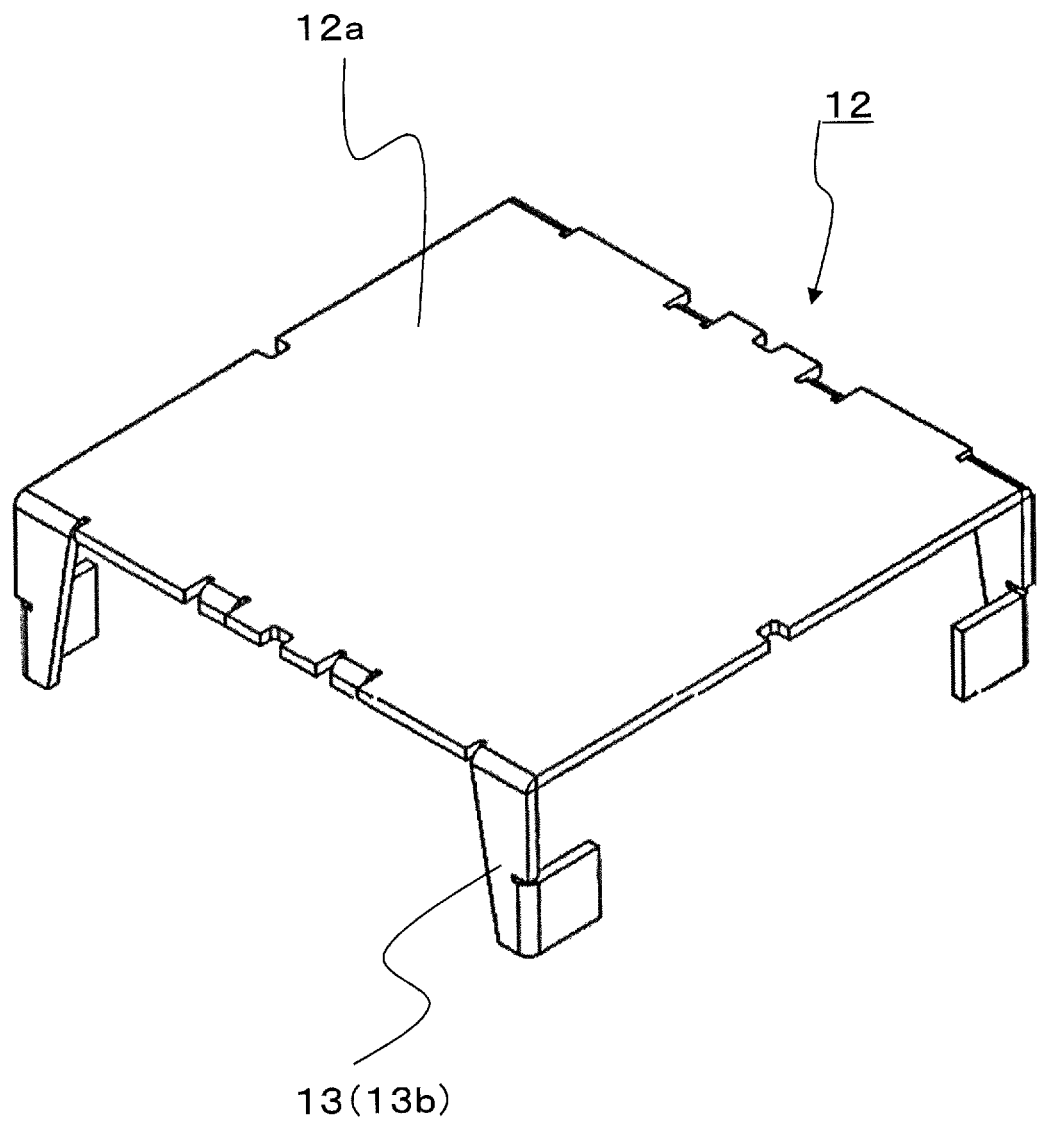
FIG. 6 is a perspective view illustrating a structure of the lid portion of the casing.

First, with reference to FIGS. 1 to 6, the configuration of the vibration generating device 100 and the structure of the casing 10 will be described. FIG. 1 is an exploded perspective view illustrating the respective members forming the vibration generating device 100. FIG. 2 is a perspective view illustrating the external appearance of the vibration generating device 100. FIG. 3 is a perspective view illustrating the external appearance of the vibration generating device 100 in which a lid portion 12 of a casing 10 is removed. FIG. 4 is a plan view illustrating a state of the vibration generating device 100 in which the lid portion 12 is removed. Furthermore, FIG. 5 is a perspective view illustrating the structure of a main body portion 11 of the casing 10. FIG. 6 is a perspective view illustrating the structure of the lid portion 12 of the casing 10.

As illustrated in FIG. 1, the vibration generating device 100 includes the casing 10 including the main body portion 11 and the lid portion 12, a coil 63, a magnetic core 61, two permanent magnets 70, and an elastic body 40. Note that the coil 63 is formed by winding a conductive wire a plurality of times around the magnetic core 61, and the magnetic core 61 and the coil 63 form an electromagnet 60.

The vibration generating device 100 generates vibration by relatively moving, in the casing 10, the electromagnet 60, which is formed of the coil 63 and the magnetic core 61, and the permanent magnet 70, by energizing the coil 63. In the vibration generating device 100, as illustrated in FIG. 3, the permanent magnet 70 is fixed to the casing 10, and the electromagnet 60, including the coil 63 and the magnetic core 61, forms a vibrating body 20, so as to be vibratable. In the electromagnet 60, which is the vibrating body 20, the coil 63 may have a major diameter of 14 mm, and the magnetic core 61 may have a longitudinal length of 15 mm, such that the electromagnet 60 is formed to have larger size than an electromagnet in conventional vibration generating devices.

Note that in the vibration generating device 100, the permanent magnet 70 is fixed to the casing 10 and the electromagnet 60 is used as the vibrating body 20. However, a configuration in which the permanent magnet 70 is the vibrating body 20 and the coil 63 is fixed to the casing 10, is also applicable.

As illustrated in FIG. 2, the vibration generating device 100 is configured to have an external appearance that is substantially cubical. The casing 10 forming the external appearance of the vibration generating device 100 includes the main body portion 11 and the lid portion 12 having a lid surface 12a covering the main body portion 11, and the main body portion 11 and the lid portion 12 are combined with each other. Also, the casing 10 has a polyhedral structure made of a magnetic metal plate material such as a galvanized steel plate or martensitic or ferritic stainless steel, etc. As illustrated in FIGS. 3 and 4, inside the casing 10, a housing 10a is formed. The coil 63, the magnetic core 61, the permanent magnet 70, and the elastic body 40 described above are accommodated in the housing 10a in the casing 10, that is, inside the main body portion 11. The casing 10 is made of a magnetic material, and, therefore, the casing 10 becomes a back yoke of the permanent magnet 70 to form a magnetic path, and it is possible to suppress the influence of the magnetic field generated by the electromagnet 60 leaking to the outside.

As illustrated in FIG. 5, the main body portion 11 constituting the casing 10 has two first surfaces 11a opposed to each other, two second surfaces 11b opposed to each other, and a bottom surface 11c, having a rectangular shape in a planar view, connected to the two first surfaces 11a and the two second surfaces 11b. The main body portion 11 is formed by bending the first surfaces 11a and the second surfaces 11b vertically upward, from the bottom surface 11c. That is, the main body portion 11 is formed by the two first surfaces 11a constituting the walls on the right side and the left side in FIG. 5; the two second surfaces 11b constituting the walls on the front side and the rear side in FIG. 5 so as to be respectively adjacent to the two first surfaces 11a and to form a right angle with the two first surfaces 11a; and the bottom surface 11c.

As illustrated in FIG. 2, a gap portion 15 is provided in the first surface 11a of the main body portion 11 of the casing 10, and an extension portion 13 is provided in the second surface 11b of the main body portion 11 that is the other surface of the casing 10 and in the lid surface 12a of the lid portion 12. Specifically, the extension portion 13 includes a first extension portion 13a formed in the main body portion 11 and a second extension portion 13b formed in the lid portion 12. Furthermore, the gap portion 15 includes a first gap portion 15a and a second gap portion 15b formed in the first surface 11a, and a third gap portion 15c formed in the second surface 11b.

As illustrated in FIG. 5, the first extension portion 13a of the extension portion 13 is formed by being bent perpendicularly in the direction from the second surface 11b to the first surface 11a of the main body portion 11, and at the leading end of the first extension portion 13a, a locking portion 14 is formed. The locking portion 14 has a key shape in which the width in the up-and-down direction of the first extension portion 13a is enlarged from the middle. The first extension portion 13a is formed at the center position of the height on the right side end and the left side end of each of the two second surfaces 11b.

Furthermore, as illustrated in FIG. 6, the second extension portion 13b is bent in the vertical direction (downward) from the lid surface 12a of the lid portion 12, and is extended, and is further bent perpendicularly in the front direction or the rear direction. The second extension portion 13b is formed at the right side end and the left side end of each of the front side and the rear side of the rectangular lid surface 12a of the lid portion 12.

As illustrated in FIGS. 2 and 5, the above-described gap portions 15 formed in the main body portion 11, that is, the first gap portion 15a and the second gap portion 15b, are formed in shapes to match the shapes of the extension portions 13, that is, the first extension portion 13a and the second extension portion 13b. Then, the extension portion 13 is fitted into the gap portion 15.

Specifically, the first extension portion 13a is extended in a direction from the second surface lib to the first surface 11a of the main body portion 11, and the locking portion 14, which is formed at the leading end of the first extension portion 13a, is fitted into the first gap portion 15a, so as to be flush with the first surface 11a. A reinforcement portion 17 is formed by fitting the first extension portion 13a into the first gap portion 15a.

The locking portion 14 has a key-like shape, and, therefore, after the locking portion 14 is fitted into the first gap portion 15a, it is difficult for the first extension portion 13a to slip out from the first gap portion 15a. That is, even if a force is applied to pull out the first extension portion 13a from the first gap portion 15a in parallel with the first surface 11a, a part of the locking portion 14 is shaped so as to be caught by the first gap portion 15a, so that it is difficult for the first extension portion 13a to be pulled out from the first gap portion 15a. As a result, the strength of the main body portion 11 in the casing 10 can be increased by a simple assembly. Furthermore, the first extension portion 13a is fitted into the first gap portion 15a so as to be flush with the first surface 11a, and, therefore, there will be no portions protruding from the first surface 11a or into the casing 10 due to overlapping plate materials, etc. Therefore, it is possible to effectively use the space inside the casing 10, and to avoid problems such as the formation of a protrusion when assembling a product in which the vibration generating device 100 is installed, and the protrusion being hooked onto a worker or an assembling device.

Furthermore, as illustrated in FIG. 2, the second extension portion 13b, which is formed by being bent in the vertical direction from the lid surface 12a of the lid portion 12, and extended, and further bent perpendicularly, is fitted into the third gap portion 15c of the main body portion 11 from the lid surface 12a of the lid portion 12, so as to extend along and to be flush with the second surface lib, and the leading end of the second extension portion 13b is fitted into the second gap portion 15b, so as to be flush with the first surface 11a. In this way, the second extension portion 13b is fitted into the second gap portion 15b and the third gap portion 15c so as to be flush with the first surface 11a and the second surface 11b, whereby the reinforcement portion 17 is further formed.

The second extension portion 13b extends along the second surface lib, and is fitted into the second gap portion 15b of the first surface 11a, and, therefore, the lid surface 12a of the lid portion 12, the second surface 11b and the first surface 11a of the main body portion 11 are engaged with each other at the same time. As a result, an overall strength of the casing 10 can be increased by a simple assembly. Furthermore, the second extension portion 13b is made to be flush with the first surface 11a and the second surface 11b. Therefore, similar to the case of the first extension portion 13a, it is possible to effectively use the space inside the casing 10, and to avoid problems such as the formation of a protrusion and the protrusion being hooked onto a worker, etc.

As illustrated in FIG. 5, in each of the two second surfaces 11b of the casing 10, two pressing plates 18 are provided so as to be parallel to the first surface 11a and to protrude inward to the casing 10. Furthermore, in each of the two second surfaces 11b of the casing 10, four attachment claw portions 19 are provided so as to be parallel to the bottom surface 11c and to protrude inward to the casing 10. The plurality of pressing plates 18 and the plurality of attachment claw portions 19 are used to hold the permanent magnet 70 and the elastic body 40 in the casing 10. Note that the holding structure of the permanent magnet 70 and the elastic body 40 in the casing 10 will be described later.

Figure 7:
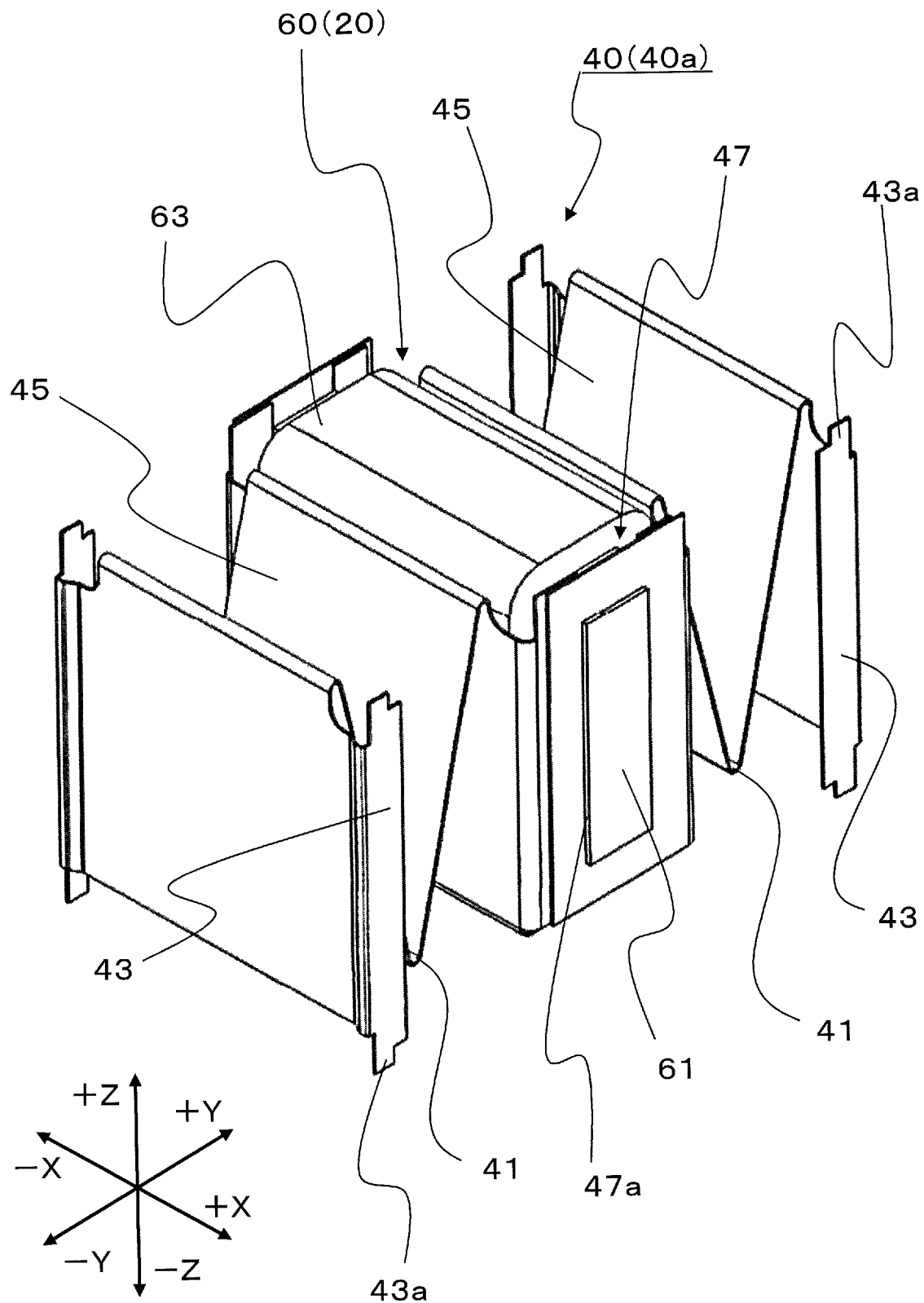
FIG. 7 is a perspective view illustrating a structure of an elastic body in a state where a vibrating body is accommodated.
Figure 8:
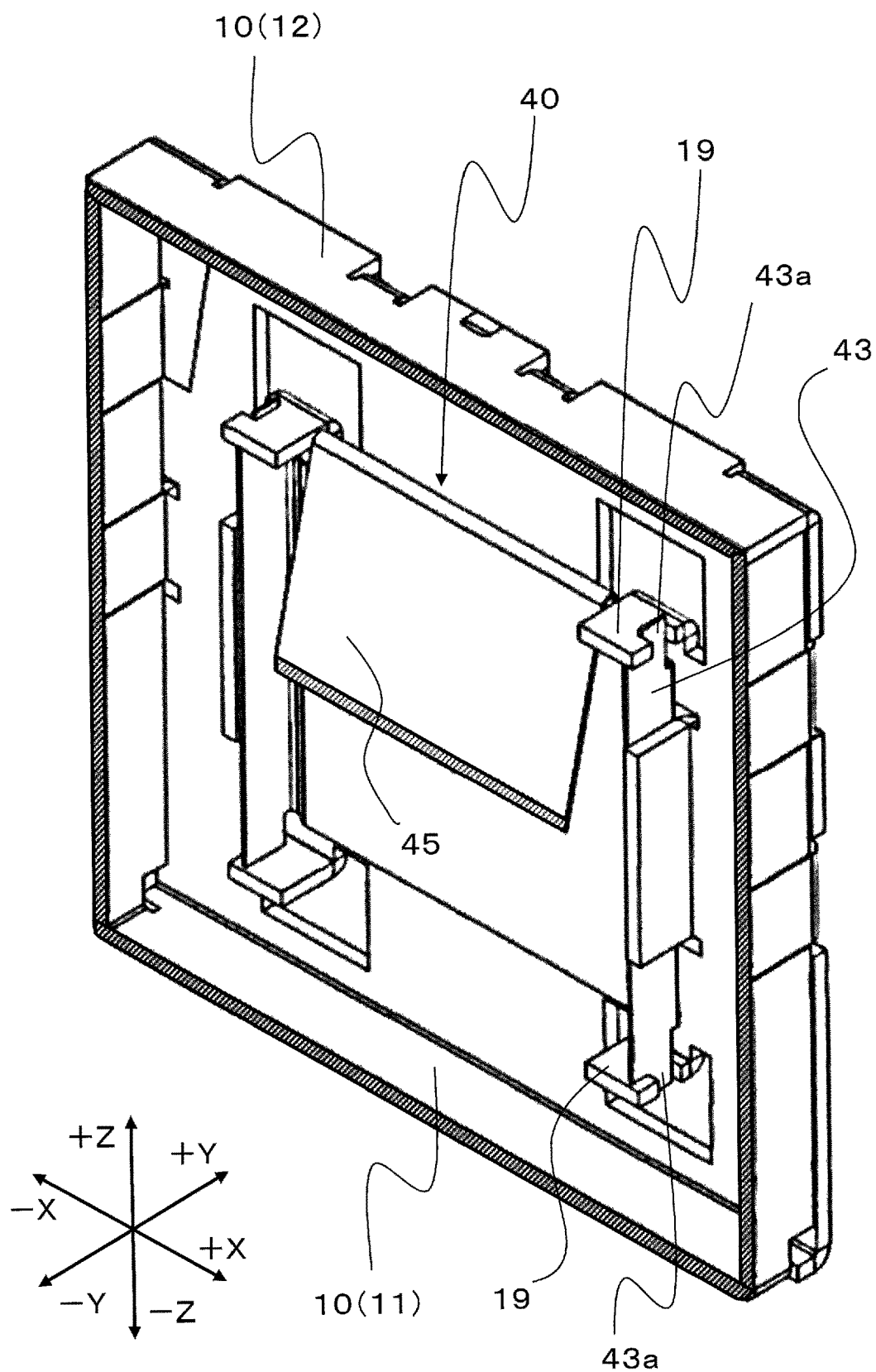
FIG. 8 is a cross-sectional perspective view illustrating a state in which the elastic body is attached to the casing.
Figure 9:
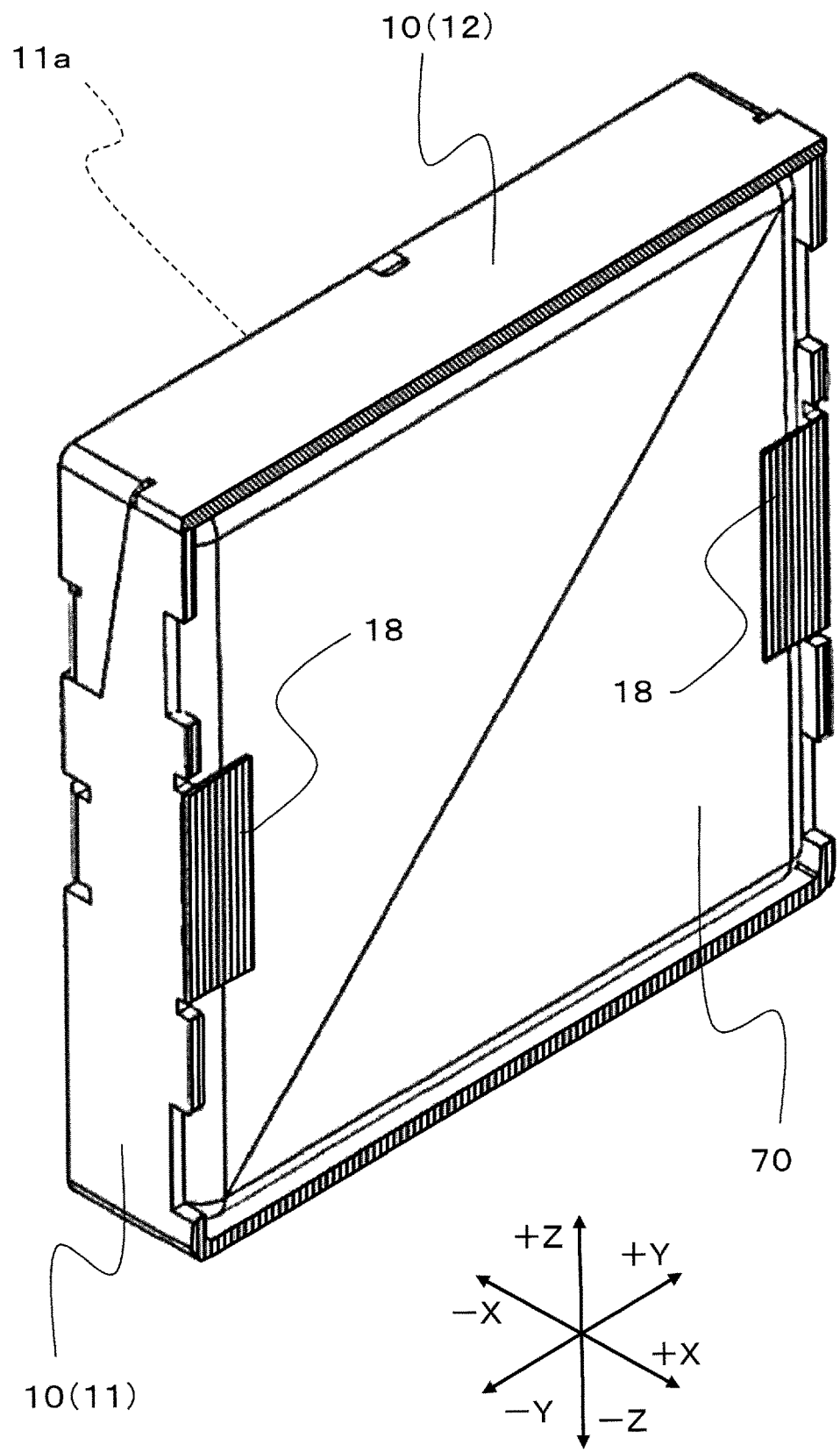
FIG. 9 is a cross-sectional perspective view illustrating a state in which a permanent magnet is attached to the casing.

Next, referring to FIGS. 3, 4, and 7 to 9, the internal structure of the vibration generating device 100 other than the casing 10 will be described. FIG. 7 is a perspective view illustrating the structure of the elastic body 40 in a state where the vibrating body 20 is accommodated within the elastic body 40, FIG. 8 is a cross-sectional perspective view illustrating a state where the end portion on the rear side of the elastic body 40 is attached to the casing 10 as viewed from a line A-A in FIG. 4, and FIG. 9 is a cross-sectional perspective view illustrating a state in which the permanent magnet 70 is attached to the casing 10 as viewed from a line B-B in FIG. 4. Note that in FIG. 8, in order to make the state of attachment of the elastic body 40 to the casing 10 easier to view, the permanent magnet 70 is not shown.

As illustrated in FIG. 7, the elastic body 40 is configured to include a plurality of flat portions 45, a plurality of folded portions 41, an attachment portion 43 provided with engagement claw portions 43a at upper and lower ends thereof, and a holding portion 47. The elastic body 40 is a plate spring 40a formed by bending, a plurality of times, a metal plate having a spring property extending in the front-rear direction, such that the fold lines are along the left-right direction.

Each of the plurality of folded portions 41 is a portion bent along the fold line of the plate spring 40a. Furthermore, the flat portion 45 is a substantially square portion extending from one of the plurality of folded portions 41 toward the other, and includes a side along the direction of the fold line and a side along the extending direction.

The holding portion 47 is a substantially rectangular parallelepiped box-like portion in a planar view. The holding portion 47 is provided at the center portion of the elastic body 40, and is disposed so as to be positioned at the center of the casing 10 in a state in which the longitudinal direction of the rectangular parallelepiped shape is directed in the right and left direction, as illustrated in FIG. 4.

As illustrated in FIG. 7, in the box-like holding portion 47, in the center of the left and right walls thereof, rectangular attachment holes 47a, which are long in the up-and-down direction, are provided. The magnetic core 61, around which the coil 63 is wound, is inserted through the attachment holes 47a, and is crimped and fixed by being fastened to the walls of the holding portion 47 in which the attachment holes 47a are formed. Note that the magnetic core 61 may be formed of a magnetic material such as silicon steel.

As described above, the coil 63 and the magnetic core 61 are accommodated and held inside the holding portion 47, and the coil 63 and the magnetic core 61, together with the holding portion 47, form the vibrating body 20. The elastic body 40 including the holding portion 47 elastically deforms along the front-rear direction and the up-and-down direction, thereby supporting the vibrating body 20 so as to be vibratable along the front-rear direction and the up-and-down direction.

The attachment portion 43 of the elastic body 40 is formed at the right and left end portions at both end portions in the front-rear direction of the elastic body 40, and the engagement claw portions 43a are formed at predetermined positions above and below the attachment portion 43.

As described above, on each of the two second surfaces 11b of the casing 10 illustrated in FIG. 5, there are provided a plurality of attachment claw portions 19 that are parallel to the bottom surface 11c and that are projected inward to the casing 10. As illustrated in FIG. 8, the elastic body 40 is attached to and held by the casing 10 by engaging the engagement claw portions 43a of the attachment portion 43 with the attachment claw portions 19 protruding inward to the casing 10. The elastic body 40 is configured to be slightly larger than the inner dimension of the casing 10 in a state where the elastic body 40 is not fixed, and is inserted to and attached to the casing 10 while being contracted in the Y direction.

The attachment claw portions 19 are provided at four positions on the upper, lower, right, and left portions of each second surface 11b of the casing 10, and, therefore, the elastic body 40 is stably held in the casing 10. Furthermore, the elastic body 40 is attached to the respective second surfaces 11b of the casing 10 in the Y direction, that is, with an urging force in the direction perpendicular to the second surfaces 11b, and, therefore, rattling does not occur between the attachment claw portions 19 of the casing 10 and the engagement claw portions 43a of the attachment portions 43, and the elastic body 40 is stably held in the casing 10.

The plate spring 40a having a folded structure as in the elastic body 40 illustrated in FIG. 7, has a feature of being easily elastically deformed in a direction orthogonal to the fold lines (front-rear direction and up-and-down direction). That is, such a plate spring 40a can be elastically deformed along the front-rear direction by expansion and contraction, and can be elastically deformed along the up-and-down direction by bending. On the other hand, such a plate spring 40a also has a feature of being difficult to deform in a direction along the fold line (left-and-right direction), so that the plate spring 40a is suitable as a member for suppressing the movement along the left-and-right direction.

Furthermore, in the plate spring 40a having such a folded structure, the ease of deformation is usually different for the elastic deformation along the up-and-down direction due to bending, and the elastic deformation along the front-rear direction due to expansion and contraction. Therefore, assuming that the elastic coefficient of the elastic body 40 in the front-rear direction is a first elastic coefficient and the elastic coefficient of the elastic body 40 in the up-and-down direction is a second elastic coefficient, the first elastic coefficient and the second elastic coefficient are different values.

Note that the vibrating body 20 is supported by the elastic body 40 and vibrates along the front-rear direction at a first natural frequency determined corresponding to the first elastic coefficient and the mass of the vibrating body 20, and vibrates along the up-and-down direction at a second natural frequency determined corresponding to the second elastic coefficient and the mass of the vibrating body 20. The first elastic coefficient and the second elastic coefficient are different values, and, therefore, the first natural frequency and the second natural frequency are also different values.

As illustrated in FIGS. 3 and 4, the vibration generating device 100 has two permanent magnets 70. The permanent magnet 70 is a substantially rectangular parallelepiped plate-shaped magnet. The two permanent magnets 70 are disposed on the right end portion side and the left end portion side of the casing 10, respectively, so as to be located on extension lines in the left-and-right direction of the magnetic core 61 constituting the vibrating body 20. That is, the two permanent magnets 70 are respectively disposed and fixed to the opposing two first surfaces 11a of the casing 10.

As described above, on each of the two second surfaces 11b of the casing 10 illustrated in FIG. 5, there are provided the two pressing plates 18 that are parallel to the first surface 11a and that protrude inward to the casing 10. Also, as illustrated in FIGS. 4 and 9, the center portion the permanent magnet 70 in the front-rear direction, is sandwiched and held between the pressing plate 18 and the first surface 11a of the casing 10.

The permanent magnet 70 is sandwiched between the pressing plate 18 provided parallel to the first surface 11a and the first surface 11a of the casing 10, and, therefore, the permanent magnet 70 is stably held in the casing 10.

Figure 10:
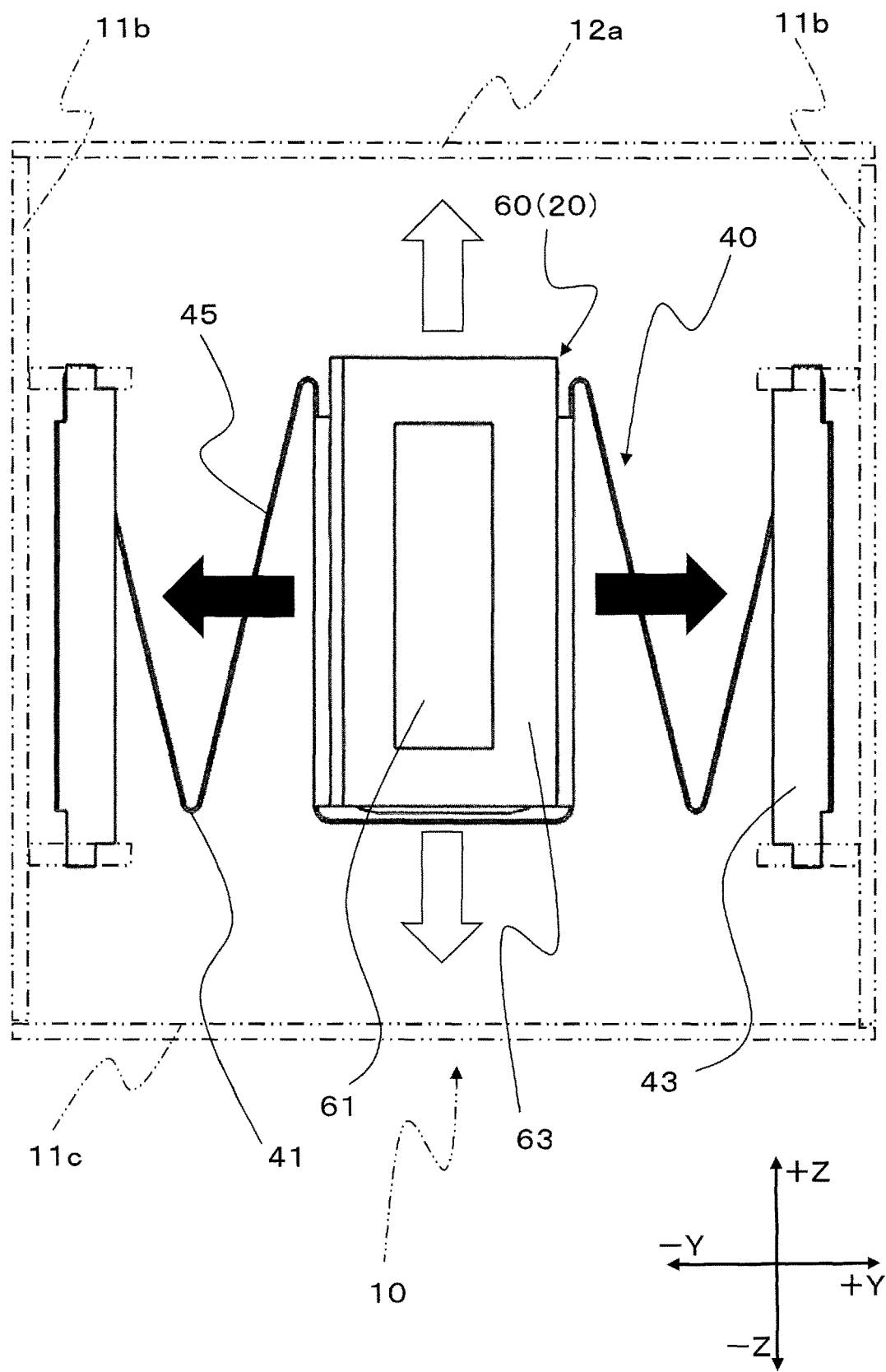
FIG. 10 is an explanatory diagram illustrating the movement of the vibrating body in the casing.

Next, the motion of the vibration generating device 100 will be described with reference to FIG. 10. FIG. 10 is an explanatory view illustrating the motion of the vibrating body 20 in the casing 10.

As described above, the magnetic core 61 and the coil 63 form the electromagnet 60, and form the vibrating body 20 accommodated within the elastic body 40. Furthermore, two permanent magnets 70 are disposed in the casing 10. Also, the electromagnet 60 generates a magnetic field as an electric current is passed through the coil 63, and magnetizes the front end portion and the rear end portion of the magnetic core 61. Furthermore, the permanent magnet 70 is disposed on the casing 10 side so as to face the electromagnet 60 in the front-to-rear direction. By utilizing the magnetic force between the electromagnet 60 and the permanent magnet 70, it is possible to drive the vibrating body 20 in the front-rear direction and the up-and-down direction.

On the other hand, as described above, the vibrating body 20 is supported so as to be vibratable along the front-rear direction and the up-and-down direction by the elastic body 40. Also, the vibrating body 20 vibrates along the front-rear direction at the first natural frequency determined corresponding to the first elastic coefficient and the mass of the vibrating body 20, and vibrates along the up-and-down direction at the second natural frequency determined corresponding to the second elastic coefficient and the mass of the vibrating body 20.

Therefore, when the electromagnet 60 generates a magnetic field having the same frequency as the first natural frequency, the vibrating body 20 can easily vibrate in the front-rear direction as indicated by the black arrow in FIG. 10. As a result, the vibrating body 20 vibrates along the front-rear direction. Furthermore, when the electromagnet 60 generates a magnetic field having the same frequency as the second natural frequency, the vibrating body 20 can easily vibrate in the up-and-down direction as indicated by the white arrow in FIG. 10. As a result, the vibrating body 20 vibrates along the up-and-down direction.

In other words, the vibrating body 20 can vibrate in a direction (Y direction) orthogonal to the two second surfaces 11b of the casing 10 and in a direction (Z direction) orthogonal to the bottom surface 11c of the casing 10 and the lid surface 12a. Note that the above-described magnetic field can be generated by applying an AC voltage or a pulse voltage at a predetermined frequency to the coil 63 in the electromagnet 60. Furthermore, in this case, the magnitude of the magnetic field changes depending on the magnitude of the voltage, and the amplitude of the vibrating body 20 can be changed according to the voltage.

In the vibration generating device 100, by utilizing such a relationship between the frequency of the magnetic field and the ease of vibration of the vibrating body 20, it is possible vibrate the vibrating body 20 in the front-rear direction by the magnetic field having the same frequency as the first natural frequency, and to vibrate the vibrating body 20 along the up-and-down direction by a magnetic field having the same frequency as the second natural frequency.

Therefore, due to the vibration generated by the vibration generating device 100 itself, the casing 10 needs to have strength against vibration in the Y direction and the Z direction. In this respect, in the Y direction, the strength is maintained by the function of the locking portion 14, and in the Z direction, the strength is maintained as the second extension portion 13b is fitted into the second gap portion 15b. In the Y direction and in the Z direction, the strength is maintained by the same functions, with respect to the impact applied from the outside of the vibration generating device 100. Furthermore, in the Y direction, the urging force of the elastic body 40 also functions, and also against this urging force, the locking portion 14 functions to maintain the strength.

Furthermore, with respect to the impact applied from the outside of the vibration generating device 100, the strength against the X direction is also required, in addition to the above. For the impact applied in the X direction, the electromagnet 60 does not directly collide with the casing 10, but the electromagnet 60 collides with the permanent magnet 70, and the permanent magnet 70 pushes the casing 10. At this time, the permanent magnet 70 is held by the first surface 11a, the extension portion 13, and the pressing plate 18, and, therefore, the force in the X direction applied to the permanent magnet 70 is not only applied to the first surface 11a in the X direction, but is also distributed to the second surface 11b. Accordingly, the strength of the casing is maintained in all of the directions, i.e., the X direction, the Y direction, and the Z direction.

Hereinafter, effects of the present embodiment will be described.

The vibration generating device 100 is provided with the reinforcement portion 17, in which the extension portion 13 provided on the other surfaces 11b, 12a of the casing 10, is fitted into the gap portion 15 provided on the first surface 11a of the casing 10. Therefore, the casing 10 can be strengthened, and the assembling property can be improved.

Furthermore, the reinforcement portion 17 is fitted into the first gap portion 15a provided in the first surface 11a by the locking portion 14 formed at the leading end of the first extension portion 13a provided on the second surface lib of the main body portion 11, and, therefore, the engagement between the first surface 11a and the second surface 11b of the main body portion 11 can be strengthened.

As a further reinforcement portion 17, the second extension portion 13b provided in the lid portion 12 extends along the second surface lib of the main body portion 11 and is fitted into the second gap portion 15b provided in the first surface 11a, so that the engagement between the main body portion 11 and the lid portion 12 can be strengthened. As a result, the entire casing 10 can be strengthened.

Furthermore, the main body portion 11 of the casing 10 can be formed such that the two first surfaces 11a and the two second surfaces 11b are vertically bent from the rectangular bottom surface 11c, and, therefore, the vibration generating device 100 may be easily assembled.

Furthermore, the vibrating body 20, formed of the coil 63 and the magnetic core 61, is held by the holding portion 47 provided at the center portion of the elastic body 40 formed of the plate spring 40a, and, therefore, the vibrating body 20 can be vibrated with good balance. Therefore, stable vibration can be generated.

Furthermore, the permanent magnet 70 is sandwiched and held between the pressing plate 18 parallel to the first surface 11a of the casing 10 and the first surface 11a of the casing 10, and both ends of the elastic body 40 are held by the plurality of attachment claw portions 19, and, therefore, the entire casing 10 may be further strengthened.

Furthermore, the vibrating body 20 can vibrate in two directions orthogonal to each other, and, therefore, the vibration generating device 100 is suitable for generating vibration for haptic feedback in a game machine.

Second Embodiment

Hereinafter, a second embodiment will be described with reference to the drawings. In the second embodiment, a modified example of the vibration generating device 100 described in the first embodiment will be described. In the following description, points that are different from the vibration generating device 100 according to the first embodiment will be mainly described. In the following description, elements similar to those of the vibration generating device 100 of the first embodiment are denoted by the same reference numerals as in the first embodiment, and detailed descriptions thereof will be omitted.

Figure 11:
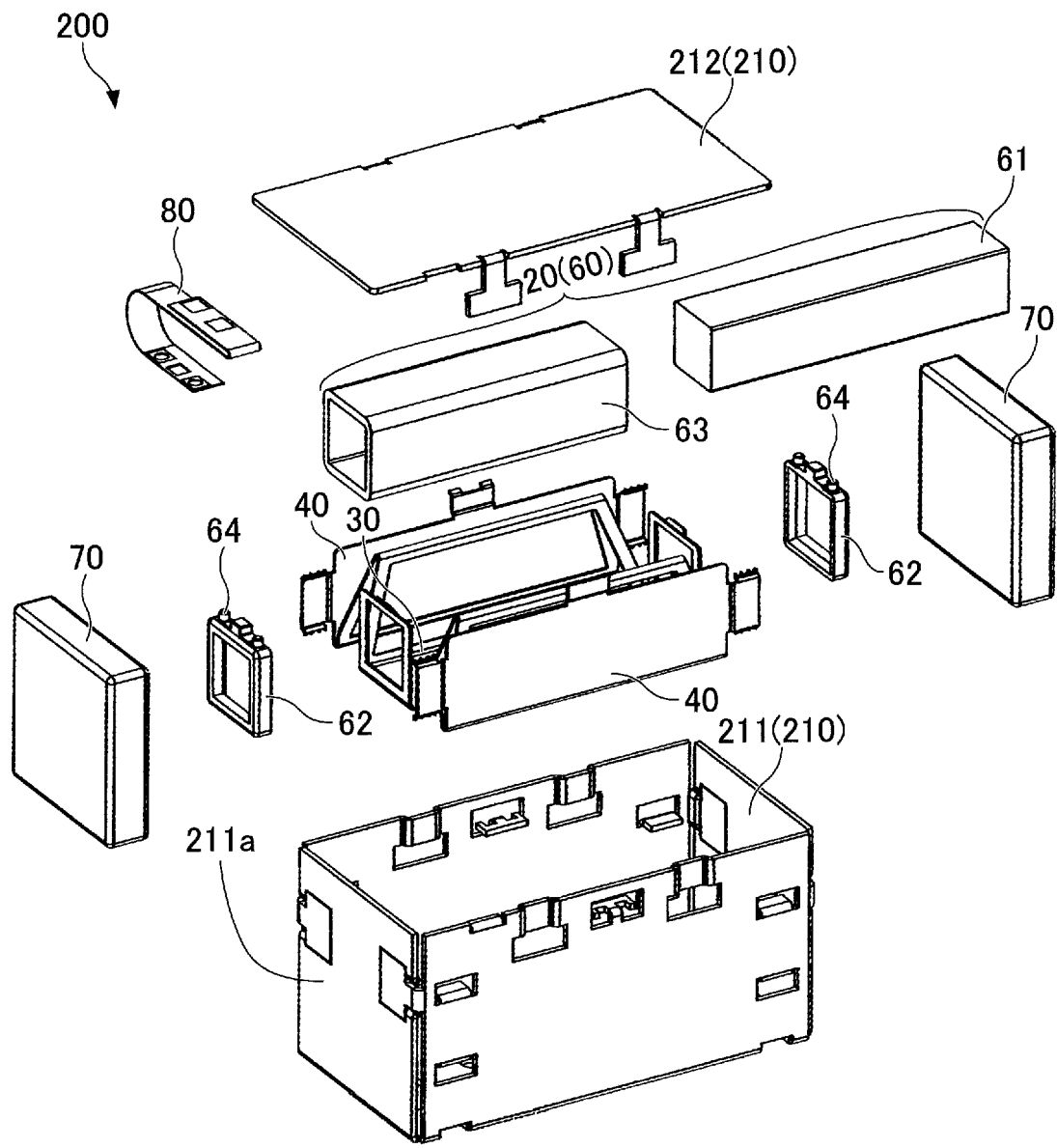
FIG. 11 is an exploded perspective view illustrating each member of a vibration generating device according to a second embodiment of the present invention.

First, with reference to FIGS. 11 and 12, the configuration of a vibration generating device 200 and the structure of a casing 210 according to the second embodiment will be described. FIG. 11 is an exploded perspective view illustrating the respective members forming the vibration generating device 200, and FIG. 12 is a perspective view illustrating the external appearance of the vibration generating device 200.

The vibration generating device 200 generates vibration by relatively moving, in the casing 210, the electromagnet 60, which is formed of the coil 63 and the magnetic core 61, and the permanent magnet 70, by energizing the coil 63. In the electromagnet 60, which is the vibrating body 20, the coil 63 may have a major diameter of 14 mm, and the magnetic core 61 may have a longitudinal length of 15 mm.

The vibration generating device 200 is configured so that the external appearance is a rectangular parallelepiped shape. The casing 210, forming the external appearance of the vibration generating device 200, includes a main body portion 211 and a lid portion 212 having a lid surface 212a covering the main body portion 211, and the main body portion 211 and the lid portion 212 are combined with each other.

Figure 12:
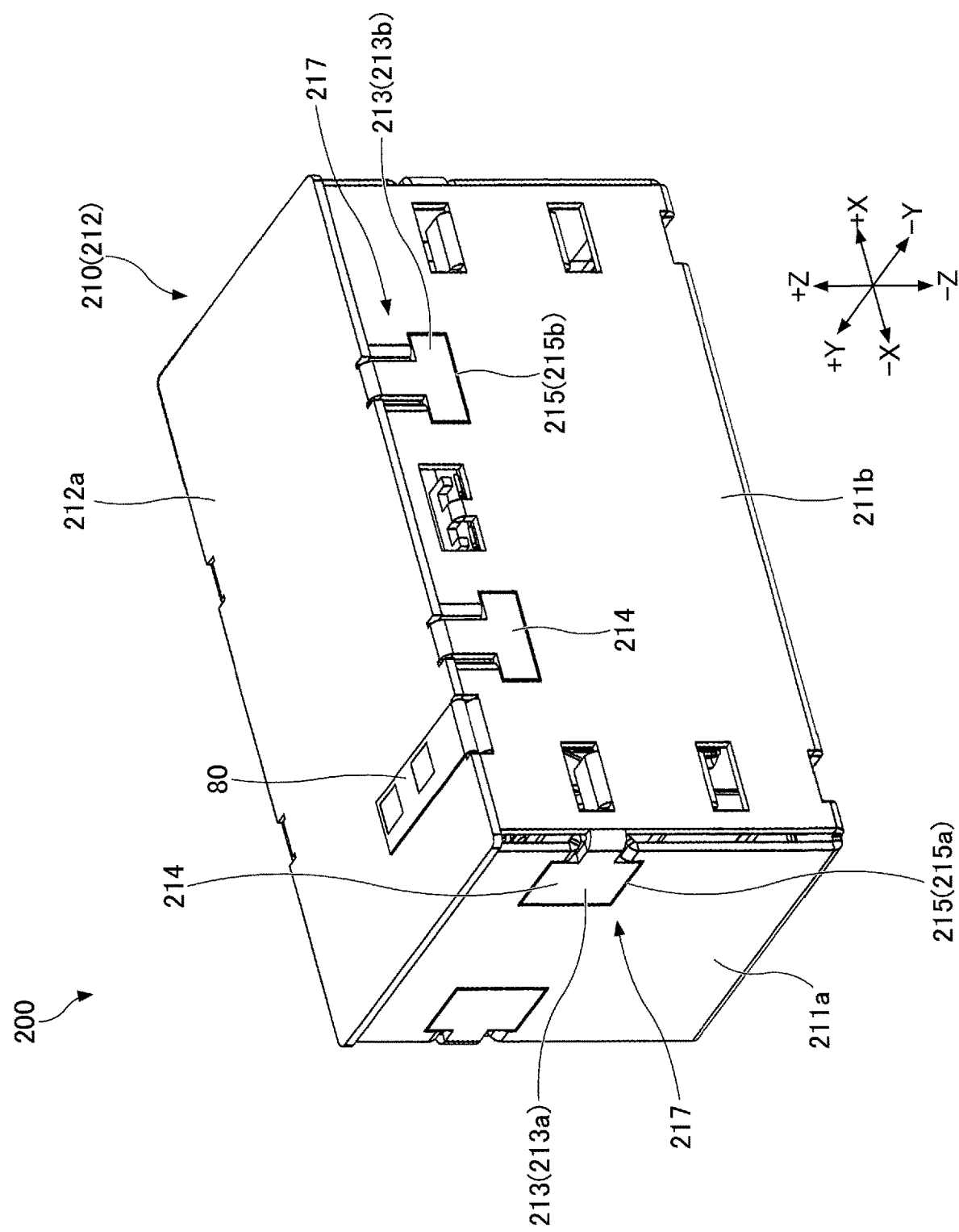
FIG. 12 is a perspective view illustrating an external appearance of the vibration generating device.
Figure 13:
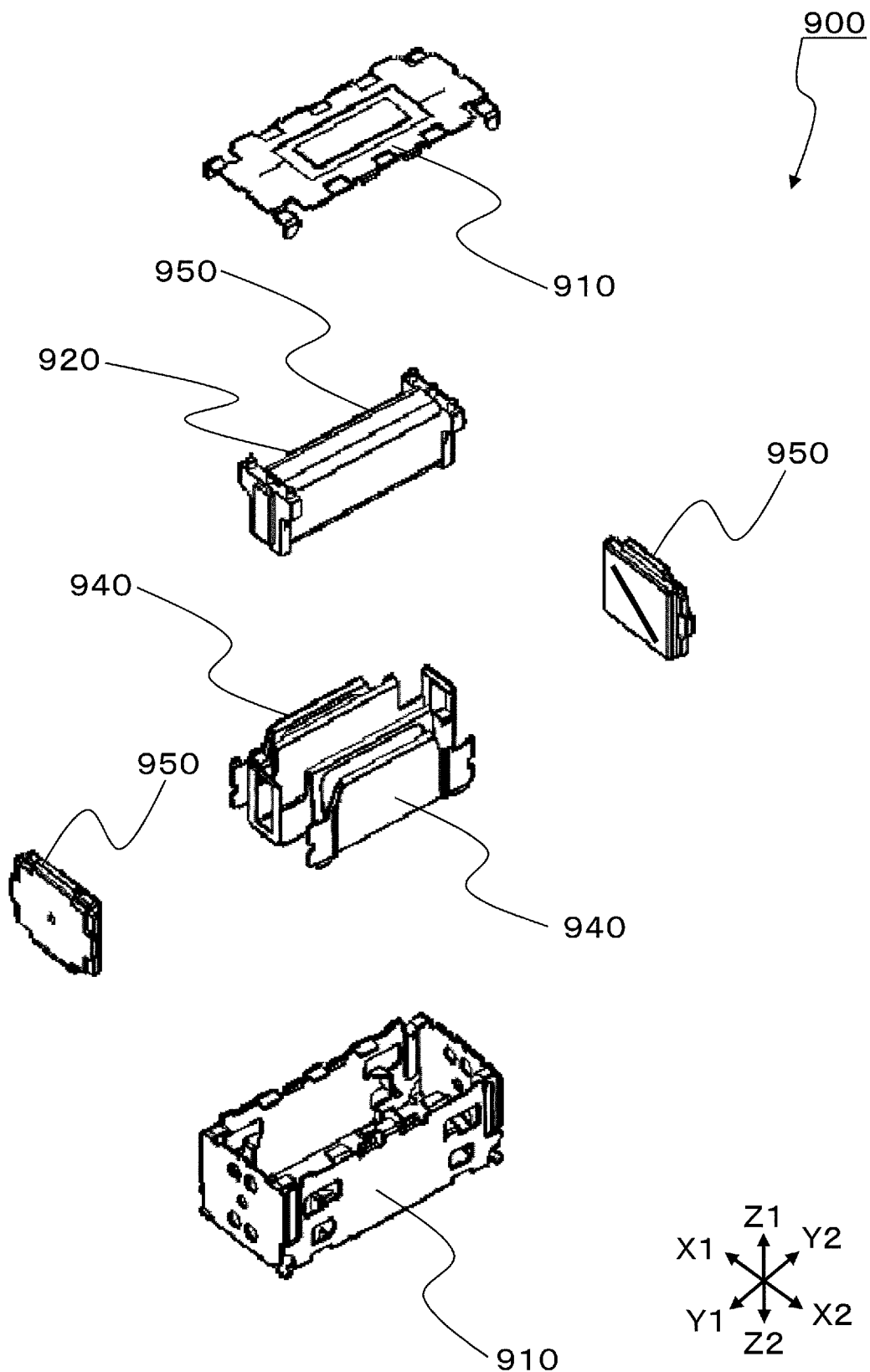
FIG. 13 is an exploded perspective view illustrating a configuration of a vibration generating device according to a conventional example.

As illustrated in FIG. 12, the main body portion 211 constituting the casing 210 has two first surfaces 211a opposed to each other, two second surfaces 211b opposed to each other, and a bottom surface 211c (not illustrated), having a rectangular shape in a planar view, connected to the two first surfaces 211a and the two second surfaces 211b. The main body portion 211 is formed by bending the first surfaces 211a and the second surfaces 211b vertically upward, from the bottom surface 211c.

As illustrated in FIG. 12, a gap portion 215 is provided in the first surface 211a and the second surface 211b of the main body portion 211 of the casing 210, and an extension portion 213 is provided in the second surface 211b of the main body portion 211 that is the other surface of the casing 210 and in the lid surface 212a of the lid portion 212. Specifically, the extension portion 213 is formed of a first extension portion 213a formed in the main body portion 211 and a second extension portion 213b formed in the lid portion 212. Furthermore, the gap portion 215 is formed of a first gap portion 215a formed in the first surface 211a and a second gap portion 215b formed in the second surface 211b.

The first extension portion 213a of the extension portion 213 is formed by being bent perpendicularly in the direction from the second surface 211b to the first surface 211a of the main body portion 211, and at the leading end of the first extension portion 213a, a locking portion 214 is formed. The locking portion 214 has a key shape in which the width in the up-and-down direction of the first extension portion 213a is enlarged from the middle.

Furthermore, the second extension portion 213b is formed by being bent in a vertical direction (downward) from the lid surface 212a of the lid portion 212, and the locking portion 214 is formed at the leading end of the second extension portion 213b. The locking portion 214 has a key shape in which the width in the left-and-right direction of the second extension portion 213b is enlarged from the middle.

As illustrated in FIG. 12, the aforementioned gap portions 215 formed in the main body portion 211 (i.e., the first gap portion 215a and the second gap portion 215b), are formed in shapes to match the shapes of the extension portion 213, that is, the first extension portion 213a and the second extension portion 213b. Also, the extension portion 213 is fitted into the gap portion 215.

Specifically, the first extension portion 213a is extended in the direction from the second surface 211b to the first surface 211a of the main body portion 211, and the locking portion 214 formed at the leading end of the first extension portion 213a is fitted into the first gap portion 215a, so as to be flush with the first surface 211a. The first extension portion 213a is fitted into the first gap portion 215a, whereby a reinforcement portion 217 is formed.

Similarly, the second extension portion 213b extending from the lid surface 212a of the lid portion 212 and formed so as to be folded in a vertical direction, is fitted into the second gap portion 215b of the main body portion 211 from the lid surface 212a of the lid portion 212, so as to be flush with the first surface 211a. In this way, the second extension portion 213b is fitted into the second gap portion 215b, so as to be flush with the second surface 211b, whereby the reinforcement portion 217 is further formed.

The vibration generating device 200 is provided with the reinforcement portion 217, in which the extension portion 213, provided in the other surfaces 211b, 212a of the casing 210, is fitted into the gap portion 215 provided in the first surface 211a and the second surface 211b of the casing 210. Therefore, the strength of the casing 210 can be increased, and the assembling property can be improved.

Furthermore, the reinforcement portion 217 has a structure in which the locking portion 214 formed at the leading end of the first extension portion 213a provided in the second surface 211b of the main body portion 211, is fitted into the first gap portion 215a provided in the first surface 211a, so that the engagement between the first surface 211a and the second surface 211b of the main body portion 211 can be strengthened.

Furthermore, as a further reinforcement portion 217, the second extension portion 213b provided in the lid portion 212 is fitted into the second gap portion 215b provided in the second surface 211b of the main body portion 211, so that the engagement between the main body portion 211 and the lid portion 212 can be strengthened. As a result, the strength of the entire casing 10 can be increased.

As described above, the vibration generating device of the present invention is provided with the reinforcement portion, in which the extension portion provided in the other surface of the casing is fitted into the gap portion provided in the first surface of the casing, and, therefore, the strength of the casing can be increased, and the assembling property can be improved.

According to an aspect of the present invention, a vibration generating device includes an electromagnet including a coil and a magnetic core around which the coil is wound; a permanent magnet; a casing to which one of the electromagnet and the permanent magnet is fixed; and an elastic body in which another one of the electromagnet and the permanent magnet is held. The vibration generating device generates a vibration by relatively moving the electromagnet and the permanent magnet by energizing the coil. The casing has a polyhedral structure made of a plate material, and the casing includes a first surface in which a gap portion is provided and another surface in which an extension portion is provided. The vibration generating device further includes a reinforcement portion that is formed by the extension portion extending from the another surface toward the first surface, thereby being fitted into the gap portion and flush with the first surface.

The vibration generating device configured as described above includes the reinforcement portion in which the extension portion provided in the other surface of the casing is fitted into the gap portion provided in the first surface of the casing, and, therefore, the strength of the casing can be increased, and the assembling property can be improved.

Furthermore, in the above configuration, the casing includes a main body portion, and a lid portion including a lid surface covering the main body portion. The casing is formed by combining the main body portion and the lid portion. The electromagnet, the permanent magnet, and the elastic body are accommodated in the main body portion. The main body portion includes a second surface that is adjacent to the first surface, the second surface forming a right angle with respect to the first surface. The extension portion includes a first extension portion formed in the main body portion and a second extension portion formed in the lid portion. The gap portion includes a first gap portion formed in the first surface and a second gap portion formed in the first surface or the second surface. The first extension portion is formed by being bent perpendicularly in a direction from the second surface to the first surface, and the first extension portion includes a locking portion formed at a leading end of the first extension portion. The reinforcement portion is formed by fitting the locking portion into the first gap portion.

In the vibration generating device configured as described above, the reinforcement portion is formed in such a manner that the locking portion, formed at the leading end of the first extension portion provided in the second surface of the main body portion, is fitted into the first gap portion provided in the first surface, and, therefore, the engagement between the first surface and the second surface of the main body portion can be strengthened.

Furthermore, in the above configuration, the second extension portion is formed by being bent vertically from the lid surface of the lid portion, and extended, and being further bent perpendicularly, and the reinforcement portion is further includes the second extension portion extending along the second surface of the main body portion, and a leading end of the second extension portion is fitted into the second gap portion such that the second extension portion is flush with the first surface.

In the vibration generating device configured as described above, as a further reinforcement portion, the second extension portion, provided in the lid portion, extends along the second surface of the main body portion, and is fitted into the second gap portion provided in the first surface, and, therefore, the engagement between the main body portion and the lid portion can be strengthened. As a result, the strength of the entire casing can be increased.

Furthermore, in the above configuration, the main body portion includes two of the first surfaces opposed to each other, two of the second surfaces opposed to each other, and a bottom surface having a rectangular shape that is connected to both of the first surfaces and both of the second surfaces, and the main body portion is formed by vertically bending the first surfaces and the second surfaces from the bottom surface.

In the vibration generating device configured as described above, the main body portion of the casing can be formed by vertically bending the two first surfaces and the two second surfaces, from the rectangular bottom surface, and, therefore, the assembly is easier.

Furthermore, in the above configuration, two of the permanent magnets are included, and the two of the permanent magnets are respectively fixed to the two of the first surfaces opposed to each other. Both ends of the elastic body are respectively held by the two of the second surfaces opposed to each other. The elastic body is formed of a plate spring including a plurality of folded portions. The elastic body includes a holding portion provided at a center portion of the elastic body. A vibrating body is formed by the coil and the magnetic core that are held inside the holding portion.

In the vibration generating device configured as described above, the vibrating body including the coil and the magnetic core is configured to be held by the holding portion provided at the center portion of the elastic body formed of a plate spring, and, therefore, the vibrating body can be vibrated with good balance. Therefore, stable vibration can be generated.

Furthermore, in the above configuration, each of the two of the second surfaces of the casing includes a pressing plate that is parallel to the first surface and that protrudes toward an inner side of the casing. The each of the two of the second surfaces of the casing includes plural attachment claw portions that are parallel to the bottom surface and that protrude toward the inner side of the casing. The permanent magnet is sandwiched and held between the first surface and the pressing plate. The both ends of the elastic body are held by the plural attachment claw portions.

In the vibration generating device configured as described above, a permanent magnet is sandwiched and held between a pressing plate parallel to the first surface of the casing and the first surface of the casing, and the two ends of the elastic body are held by the plural attachment claw portions, and, therefore, the strength of the entire casing can be further increased.

Furthermore, in the above configuration, the vibrating body is configured to vibrate in a direction orthogonal to both of the second surfaces of the casing, and in a direction orthogonal to the bottom surface and the lid surface of the casing.

The vibration generating device configured as described above, can vibrate in two directions orthogonal to each other, and, therefore, the vibration generating device is suitable for generating vibration for haptic feedback in game machines.

The present invention is not limited to the specifically disclosed embodiments, and variations and modifications may be made without departing from the scope of the present invention.

What is claimed is:

1. A vibration generating device comprising:
   an electromagnet including a coil and a magnetic core around which the coil is wound;
   a permanent magnet;
   a casing to which one of the electromagnet and the permanent magnet is fixed; and
   an elastic body in which another one of the electromagnet and the permanent magnet is held, wherein
   the vibration generating device generates a vibration by relatively moving the electromagnet and the permanent magnet by energizing the coil,
   the casing has a polyhedral structure made of a plate material, and the casing includes a first surface in which a gap portion is provided and another surface in which an extension portion is provided, and
   the vibration generating device further includes a reinforcement portion that is formed by the extension portion extending from the another surface toward the first surface, thereby being fitted into the gap portion and flush with the first surface.

2. The vibration generating device according to claim 1, wherein
   the casing includes
      a main body portion, and
      a lid portion including a lid surface covering the main body portion, wherein
   the casing is formed by combining the main body portion and the lid portion,
   the electromagnet, the permanent magnet, and the elastic body are accommodated in the main body portion,
   the main body portion includes a second surface that is adjacent to the first surface, the second surface forming a right angle with respect to the first surface,
   the extension portion includes a first extension portion formed in the main body portion and a second extension portion formed in the lid portion,
   the gap portion includes a first gap portion formed in the first surface and a second gap portion formed in the first surface or the second surface,
   the first extension portion is formed by being bent perpendicularly in a direction from the second surface to the first surface, and the first extension portion includes a locking portion formed at a leading end of the first extension portion, and
   the reinforcement portion is formed by fitting the locking portion into the first gap portion.

3. The vibration generating device according to claim 2, wherein the elastic body, which is accommodated in the main body portion, applies an urging force with respect to the second surface.

4. The vibration generating device according to claim 2, wherein
   the second extension portion is formed by being bent vertically from the lid surface of the lid portion, and extended, and being further bent perpendicularly, and
   the reinforcement portion further includes the second extension portion extending along the second surface of the main body portion, and a leading end of the second extension portion is fitted into the second gap portion such that the second extension portion is flush with the first surface.

5. The vibration generating device according to claim 2, wherein
   the main body portion includes two of the first surfaces opposed to each other, two of the second surfaces opposed to each other, and a bottom surface having a rectangular shape connected to the two of the first surfaces and the two of the second surfaces, and the main body portion is formed by vertically bending the first surfaces and the second surfaces from the bottom surface.

6. The vibration generating device according to claim 5, wherein two of the permanent magnets are included, and the two of the permanent magnets are respectively fixed to the two of the first surfaces opposed to each other, both ends of the elastic body are respectively held by the two of the second surfaces opposed to each other, the elastic body is formed of a plate spring including a plurality of folded portions, the elastic body includes a holding portion provided at a center portion of the elastic body, and a vibrating body is formed by the coil and the magnetic core that are held inside the holding portion.

7. The vibration generating device according to claim 6, wherein each of the two of the second surfaces of the casing includes a pressing plate that is parallel to the first surface and that protrudes toward an inner side of the casing, and the each of the two of the second surfaces of the casing includes plural attachment claw portions that are parallel to the bottom surface and that protrude toward the inner side of the casing, the permanent magnet is sandwiched and held between the first surface and the pressing plate, and the both ends of the elastic body are held by the plural attachment claw portions.

8. The vibration generating device according to claim 6, wherein the vibrating body is configured to vibrate in a direction orthogonal to both of the second surfaces of the casing, and in a direction orthogonal to the bottom surface and the lid surface of the casing.

* * * * *